Figure 4:
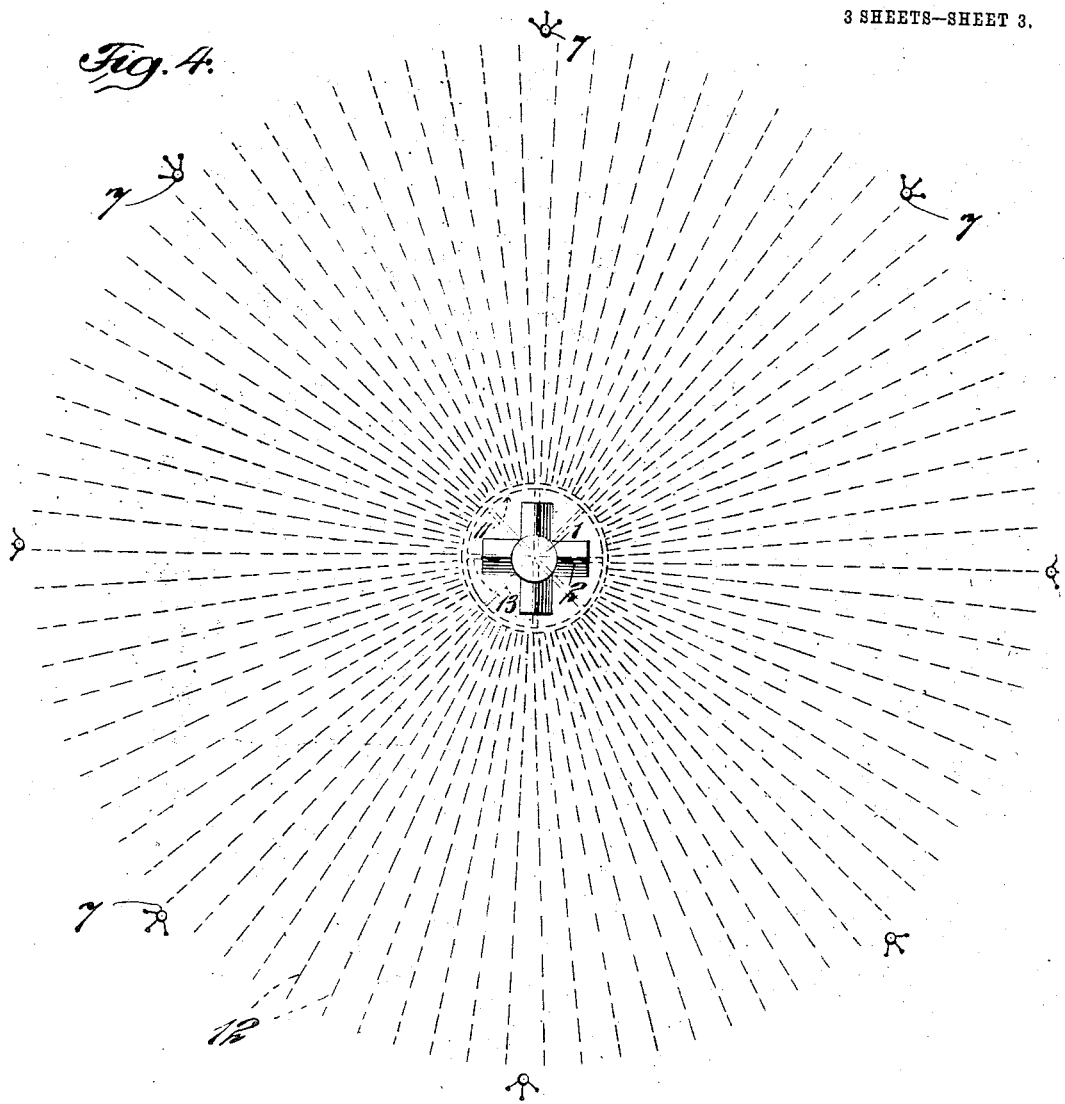

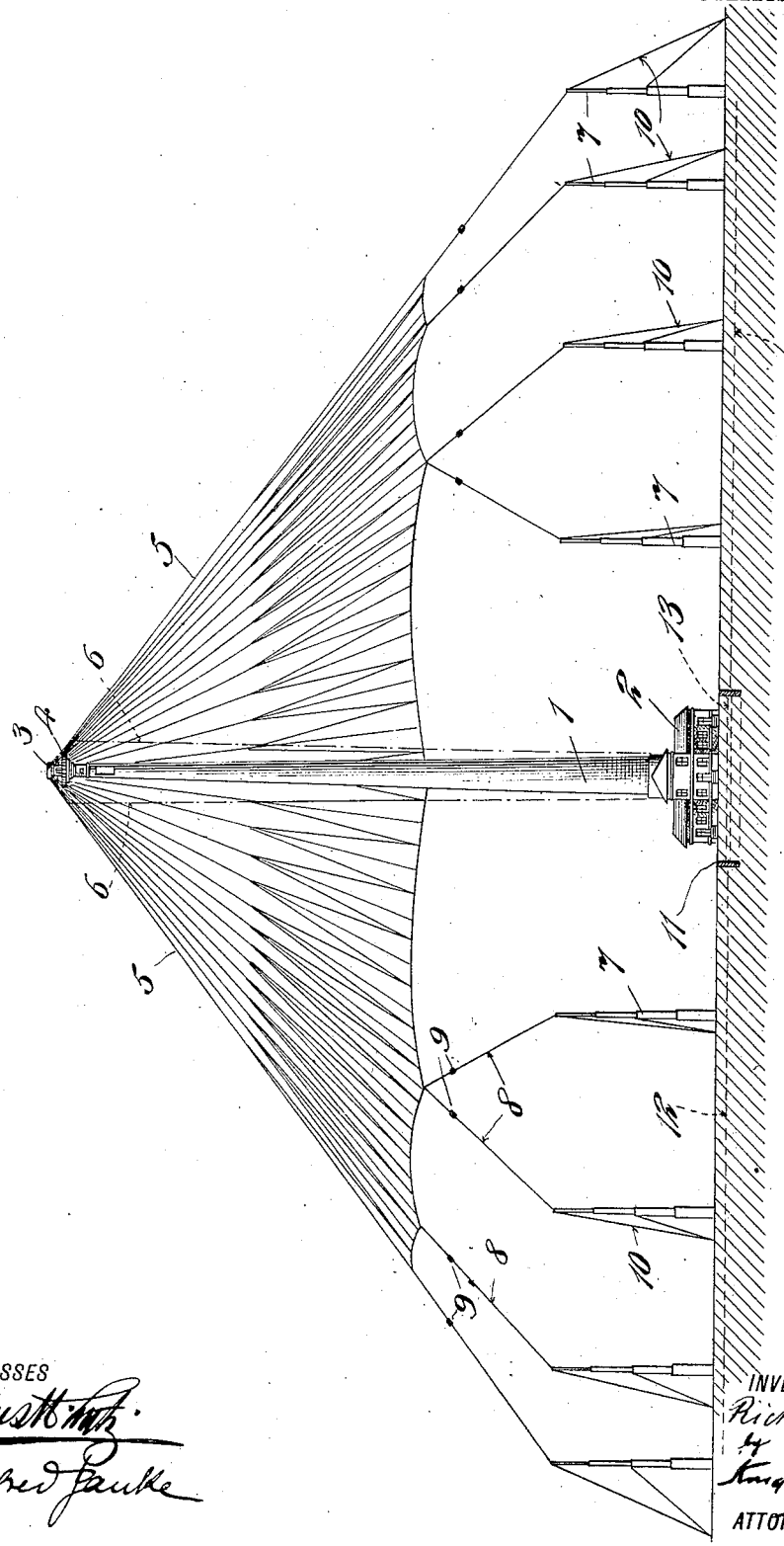
R. PFUND.
AERIAL FOR THE TRANSMISSION AND RECEPTION OF ELECTROMAGNETIC WAVE ENERGY.
APPLICATION FILED FEB. 10, 1909.
945,475. Patented Jan. 4, 1910.

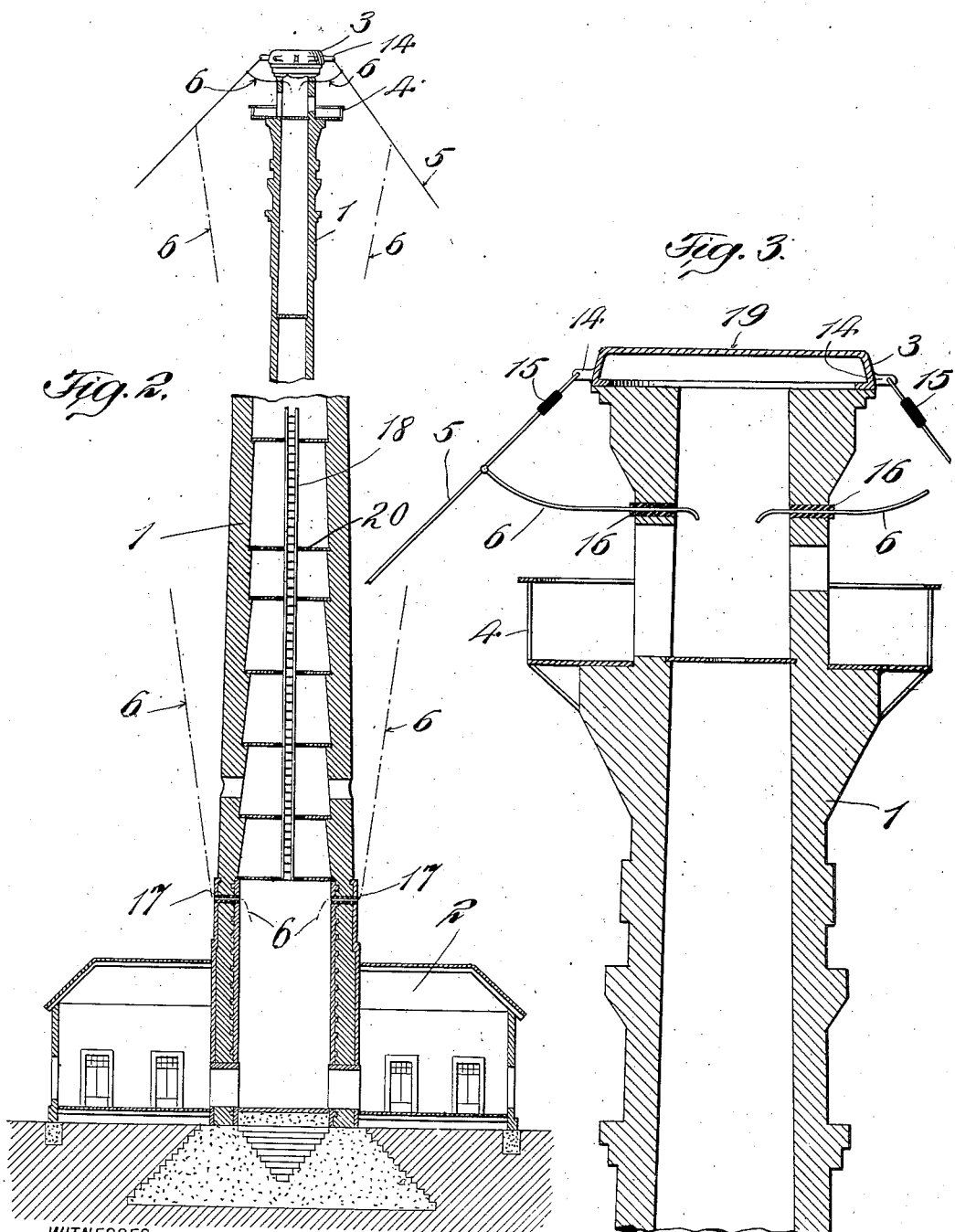

R. PFUND.
AERIAL FOR THE TRANSMISSION AND RECEPTION OF ELECTROMAGNETIC WAVE ENERGY.
APPLICATION FILED FEB. 10, 1909.

945,475.

Patented Jan. 4, 1910.
3 SHEETS—SHEET 3.

WITNESSES

INVENTOR
Richard Pfund.
BY
ATTORNEYS

UNITED STATES PATENT OFFICE.

RICHARD PFUND, OF NEW YORK, N. Y.

AERIAL FOR THE TRANSMISSION AND RECEPTION OF ELECTROMAGNETIC WAVE ENERGY.

945,475.    Specification of Letters Patent.    Patented Jan. 4, 1910.

Application filed February 10, 1909. Serial No. 477,132.

*To all whom it may concern:*

Be it known that I, RICHARD PFUND, a citizen of the United States, and a resident of city and State of New York, have invented certain new and useful Improvements in Aerials for the Transmission and Reception of Electromagnetic Wave Energy, of which the following is a full and clear description, illustrated by the accompanying drawings, and the novelty of which is pointed out more fully in the annexed claims.

My invention relates to aerials for the transmission and reception of electromagnetic wave energy and one of its objects is to provide a support for the aerial of a more permanent and safe character than that afforded by ordinary wooden poles or towers or by necessarily insulated-at-the-base and on that account mechanically weak and unsafe metallic structures of various shapes.

A further object of my invention is to make possible a more symmetrical arrangement of both the aerial system and the earth connections with respect to the station proper and to also provide a more efficient and practically permanent aerial supporting structure requiring the minimum amount of attention and maintenance and therefore a more economical structure as compared with anything used or proposed heretofore.

With low power or short range stations the objections cited may not be as apparent and pronounced but with high power or long range stations requiring aerials of considerable area and capacity and in the neighborhood of four or five hundred feet above the ground the problem of providing a suitable and safe supporting structure which, if of metal, must be insulated from the earth and then maintaining such a structure and protecting it against corrosion becomes a decidedly difficult and expensive one and it is the object of the present invention to not only overcome these various difficulties and objections but to also at the same time obtain certain other advantages not possessed by or possible with the structures used heretofore.

Briefly my invention contemplates the construction of a station in the form of a hollow stone or brick tower preferably of circular cross-section and having a height of say four hundred feet with an outside diameter at the base of twenty five feet and tapering to about six feet at the top. This combined station and tower may be built of stone or ordinary brick but I prefer to use the latter of the hollow radial type.

Surrounding the base of the tower I propose erecting a suitable building or buildings for the necessary machinery. The top of the tower I propose closing with a cap in the form of a steel or other casting having the necessary number of lugs for attaching the insulators for supporting the different sections of the aerial which would be of the so-called "umbrella" type. The leads from this aerial could either be brought down symmetrically all around the outside of the tower to a suitable number of porcelain or other leading-in insulators built into the tower just above the roofs of the station buildings at the base of the tower and from there lead into the operating room, or the leading-in insulators could be built into the tower near the top between the balcony and the cap and the aerial connected to these leading-in insulators at the top and then brought down through the interior of the tower on suitable insulators to the operating room. Should the latter method be the one adopted the aerial down leads inside the tower could be made in the shape of—or be made to form part of—a sectional porcelain insulated ladder with the different sections connected together so as to form a continuous conductor. This ladder together with such additional aerial leads as may be found necessary would of course go up through the center of the tower and would be supported on platforms—with central openings or manholes of suitable size—resting on the circular brick projections on the interior of the tower as shown in the drawings. All other necessary leads, as for instance lighting leads, would also go up through the same openings and would also be carefully insulated and so arranged that they too could be made to form part of the aerial down leads when the station was in use and would only be connected to the lighting mains when it became necessary to go up into the tower for inspection or repairs. Should it on the other hand be desired to bring the aerial down leads down around the outside of the tower the metallic insulated ladder and the auxiliary leads would of course be omitted from the interior of the tower and simply a wooden ladder or stairway provided to connect the different platforms resting on the circular brick projections mentioned above so as to make it possible to reach the top of the tower when necessary. For obvious reasons no continuous metallic conductor or conducting areas of large size not properly insulated and forming part of the aerial down leads would be permissible either on the inside or outside of the tower in either case.

In order to reduce the amount of land required to properly stay out the aerial used with for instance a four hundred foot tower I propose providing a suitable number of tubular metal poles each about one hundred feet in height and set in concrete at equal distances apart around the circumference of a circle—with the tower and the station at the center—and then staying the aerial to the top of these poles as shown. Each of these poles would of course also be properly stayed in three directions. The diameter of the circle on which these stay poles would be set would be approximately eight hundred feet for a four hundred foot tower.

For a ground connection I propose using a large number of say #9. B. & S. copper wire buried about a foot in the ground and soldered to and radiating out symmetrically to the circumference of the eight hundred foot circle referred to above from a heavy sheet copper ring or shallow cylinder buried symmetrically around the station and tower and of such a diameter as to clear the buildings and foundations as shown in the drawings. Riveted and soldered to the inside of this sheet copper ring or shallow cylinder would be a number of substantial copper strips leading toward the center like the spokes of a wheel and these strips would all be riveted and soldered together at the center of the sheet copper ring or shallow cylinder which would also be the center of the tower. This would constitute the ground and this latter portion of course would have to be put down before the tower and building foundations were completed so that the copper strips leading toward the center could be built right into the masonry.

Figure 5:
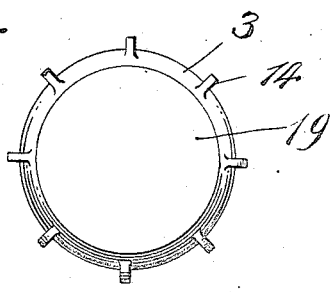

Referring to the accompanying drawings Figure 1 is a view showing an aerial arranged according to my invention; Figs. 2 and 3 show details of the tubular aerial supporting structure and the aerial proper; Fig. 4 shows diagrammatically the arrangement of the earth connections with reference to the station and also the location and method of staying the poles supporting the outer ends of the aerial; Fig. 5 shows the cap for the top of the tubular aerial support with the lugs for attaching the insulators for supporting the different sections of the aerial.

Referring to Fig. 1, 1 is the aerial supporting structure proper which, as has been pointed out above, may be made of stone or brick but preferably of perforated radial brick. At and around the base of the structure, substantially integral therewith, are disposed the buildings in which the necessary machinery and apparatus are located, and which also might contain private rooms for the operators. The top of the structure is provided with a cap which comprises a ring 3 at its base, which has lugs 14 and the cap proper 19. Near the cap the structure has a balcony 4 to facilitate the installation and maintenance of the aerial proper. The aerial proper 5, which has been mentioned before, is of the well-known umbrella type and is fastened to lugs 14 with insulator 15 interposed, as may be seen in detail from Fig. 3. The down leads 6, which are connected to the aerial near the top, are led down either on the outside of the supporting structure as shown in Fig. 2 and then through leading-in insulators 17 near the base into the operating room, or, as shown in Fig. 3, the down leads may be led through insulators 16 near the top of the structure into the interior and then down through the interior to the operating room. In this latter case the down leads may be in the form of an insulated ladder as described before. Fig. 2 shows this ladder 18 in a portion of the structure and also shows at the top the down leads running into the structure. For obvious reasons this ladder would not be in one piece but would be sectional with each section supported on platforms 20 as shown in Fig. 2.

The outer ends of the aerial are stayed to poles 7 by means of stays 8 with insulators 9 interposed. The poles 7 themselves are individually stayed by means of stays 10.

The earth connection referred to above comprises wires 12 (Figs. 1 and 4) radiating from ring 11 made of heavy sheet copper of sufficient diameter to clear the buildings, as shown in Figs. 1 and 4. To the inside of this ring are riveted and soldered heavy copper strips 13 leading toward the center of the ring, which is also the center of the entire aerial structure 1, at which point they are connected together and form the earth connection for the entire system.

What I claim is:

1. An aerial for the transmission and reception of electromagnetic wave energy consisting of a hollow structure of poorly conducting material with the necessary energizing machinery located in or around the base and the aerial proper supported symmetrically from the top of said structure and the earth connections symmetrically disposed around the base of the said structure.

2. An aerial for the transmission and reception of electromagnetic wave energy consisting of a hollow cylindrical structure of poorly conducting material with the necessary energizing machinery located in or around the base and the aerial proper symmetrically supported from the top of the said structure and the earth connections symmetrically disposed around the base of the said structure.

3. An aerial for the transmission and reception of electromagnetic wave energy consisting of a hollow cylindrical structure of poorly conducting material with the necessary energizing machinery located in or around the base and the aerial proper symmetrically supported from the top of the said structure and having earth connections comprising a conducting ring surrounding the base of said structure and located in the ground, conductors leading from said ring toward its center which forms the ground connection of the system, and conductors radiating from said ring.

RICHARD PFUND.

Witnesses:
H. ALFRED JAUKE,
OCTAVIUS KNIGHT.